April 7, 1959   F. AUTEM   2,880,538
TRANSFER APPLYING MACHINE
Filed Oct. 18, 1954   11 Sheets-Sheet 1
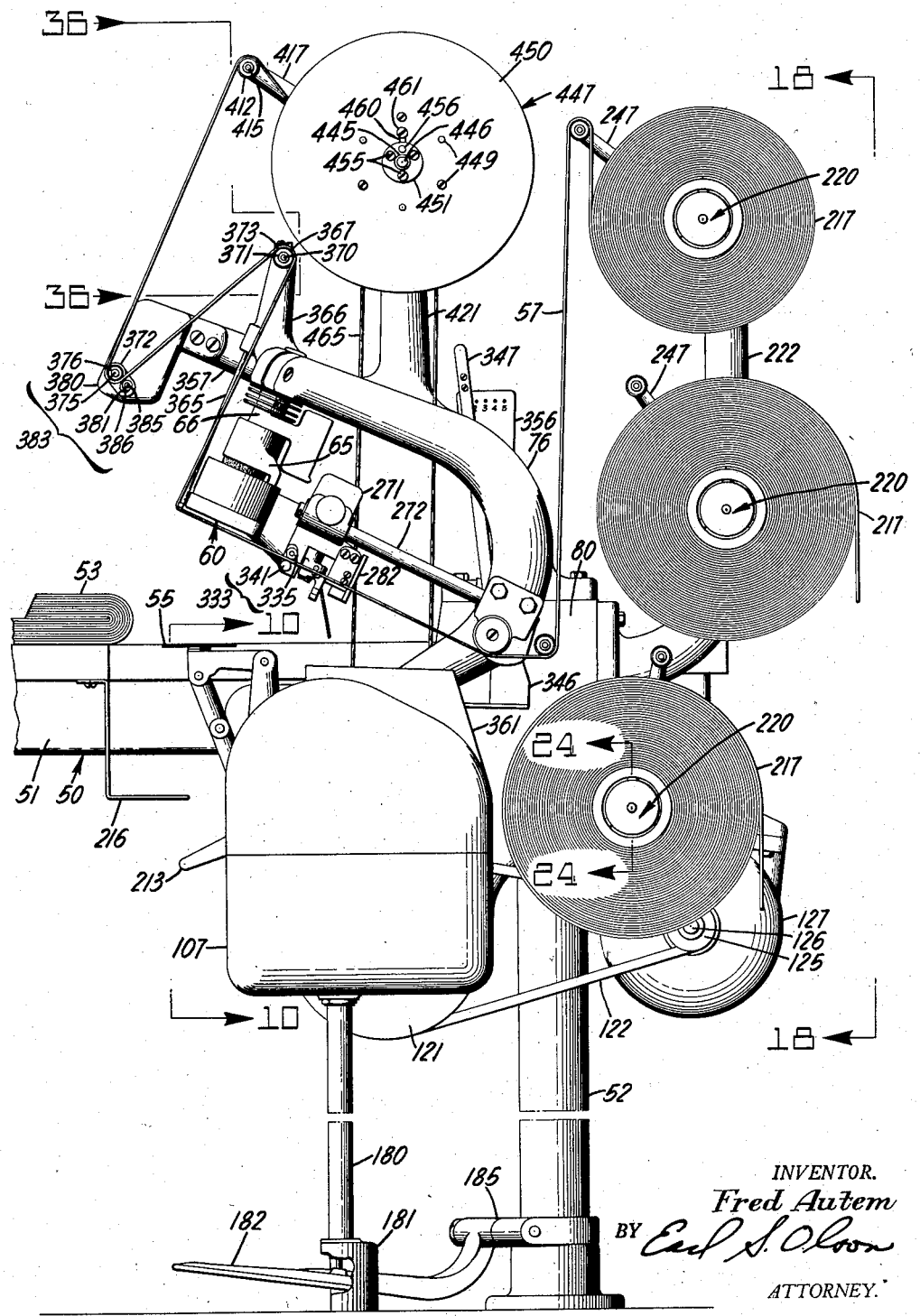
INVENTOR.
Fred Autem
BY
ATTORNEY.

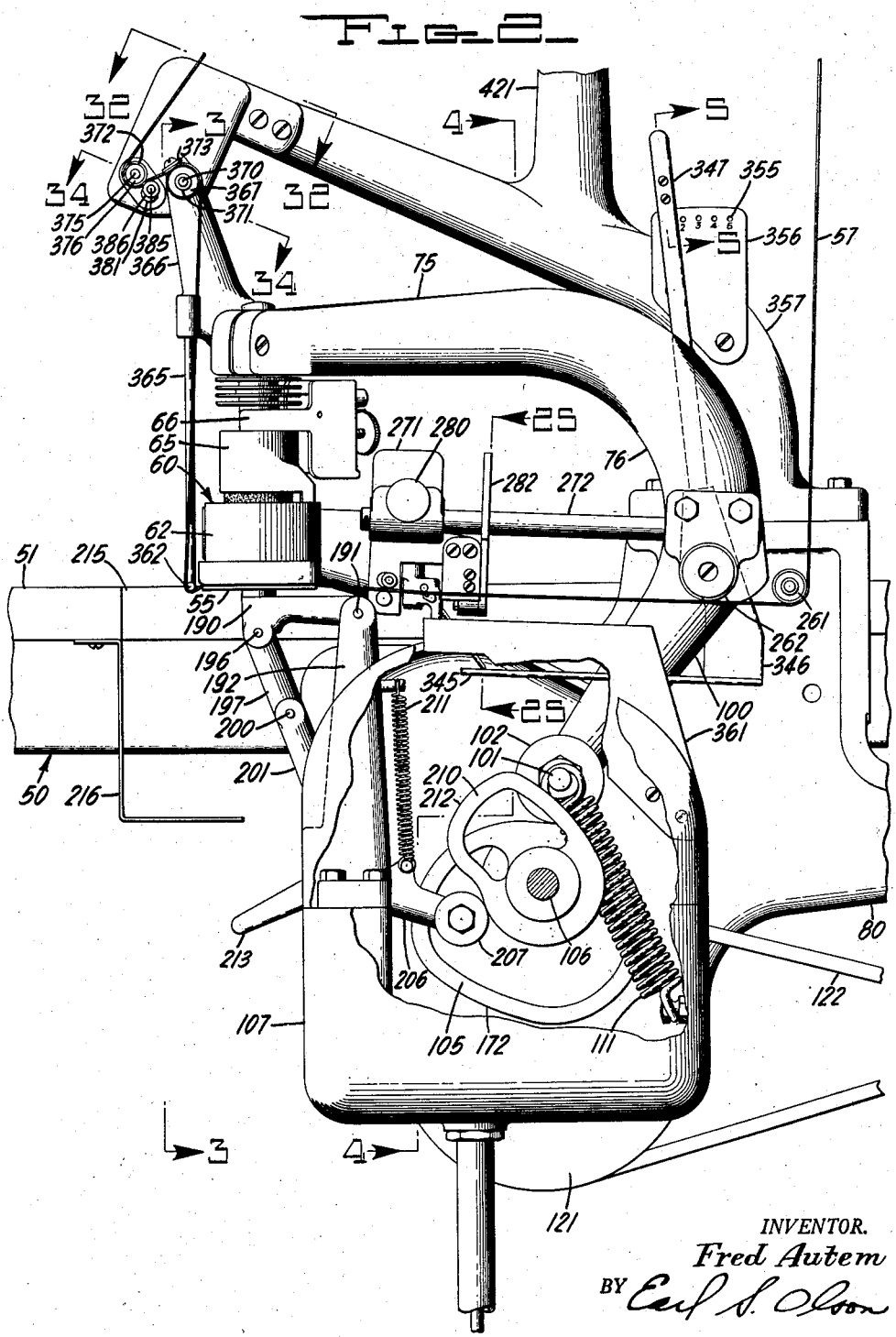

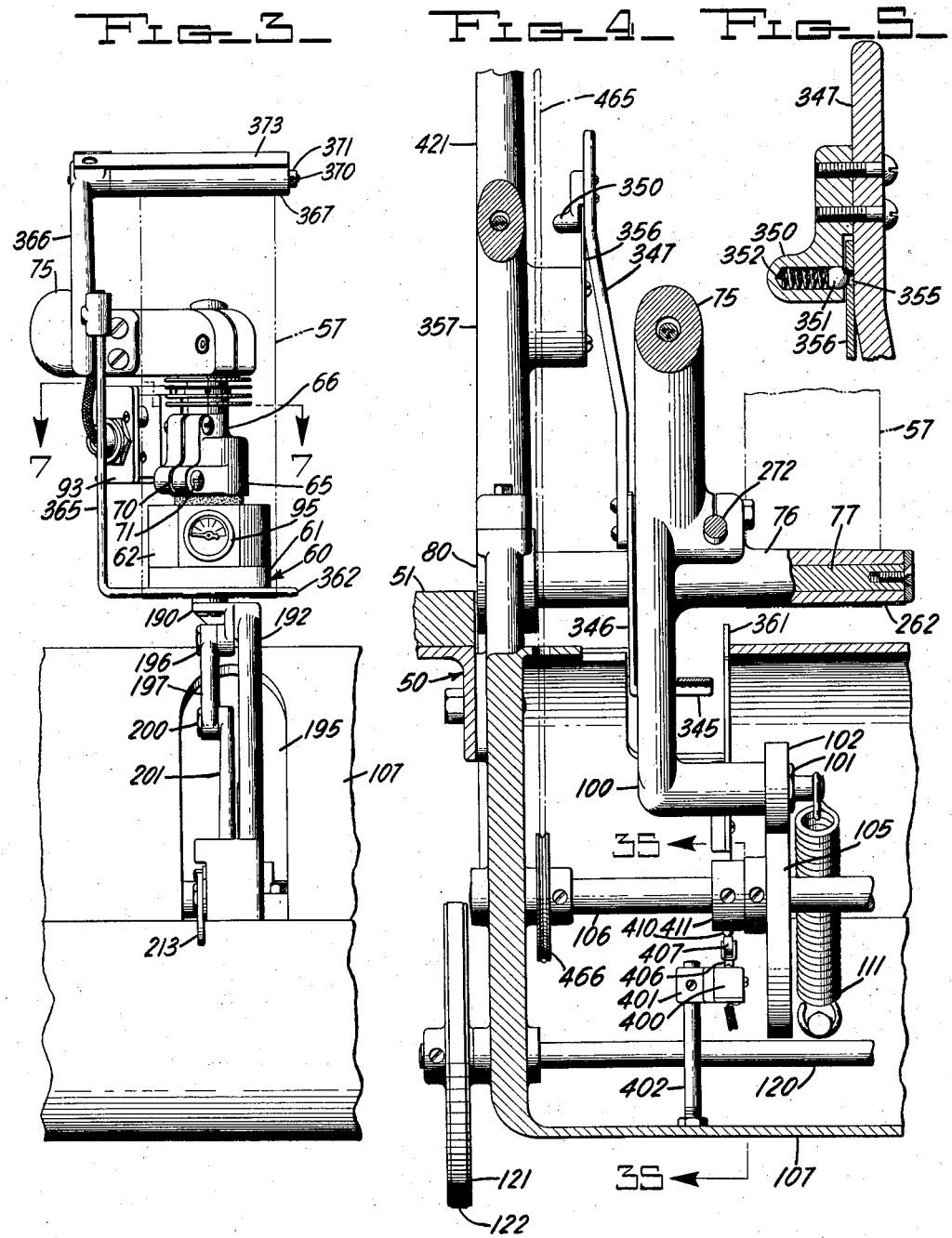

April 7, 1959 F. AUTEM 2,880,538
TRANSFER APPLYING MACHINE
Filed Oct. 18, 1954 11 Sheets-Sheet 4
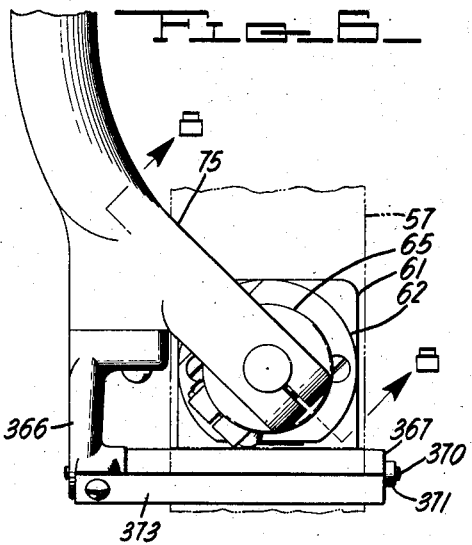
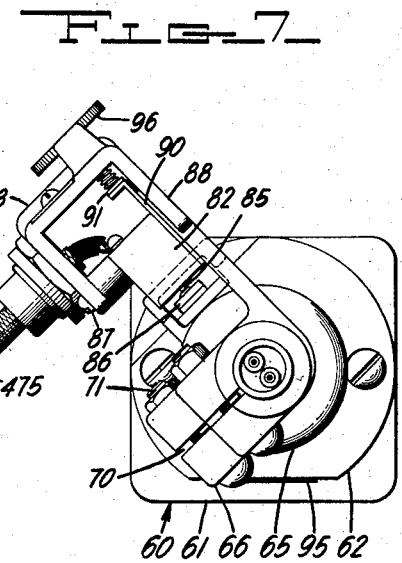
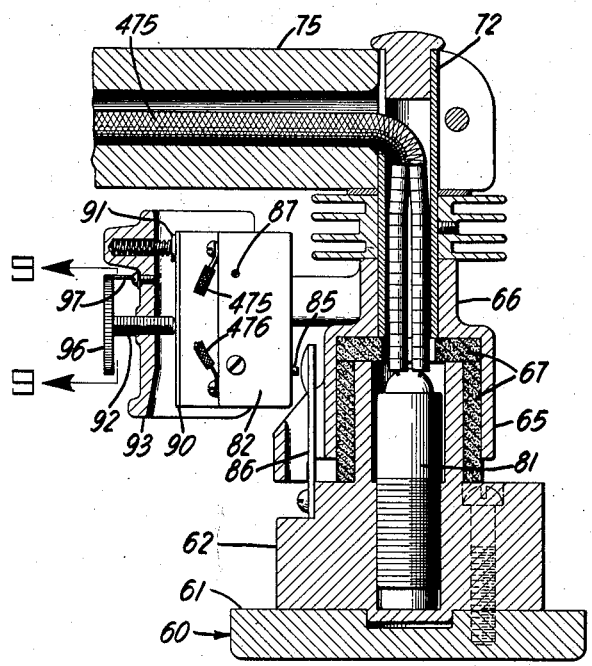
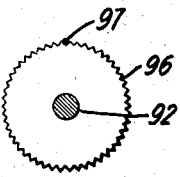
INVENTOR.
Fred Autem
BY
ATTORNEY.

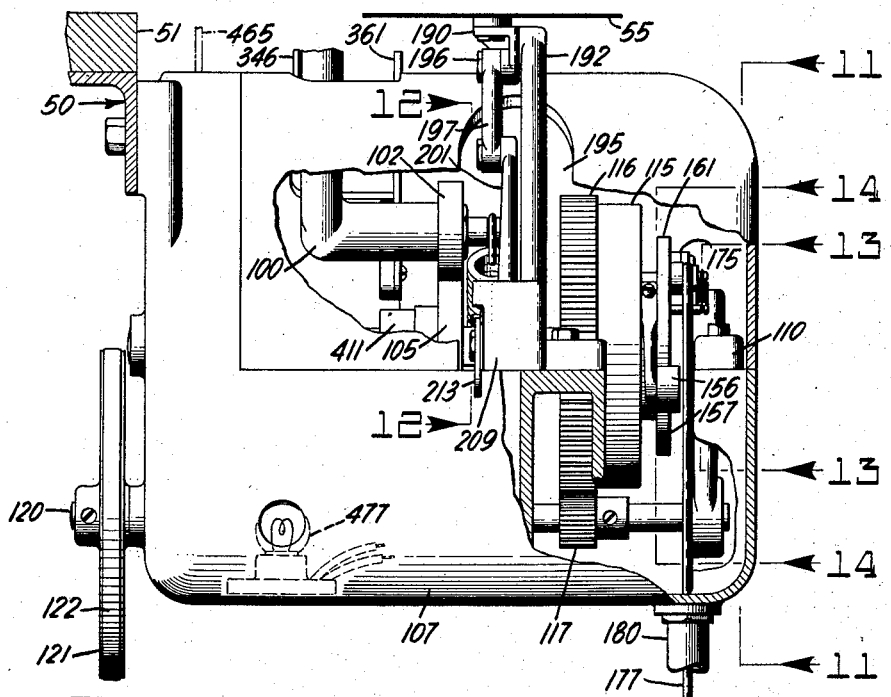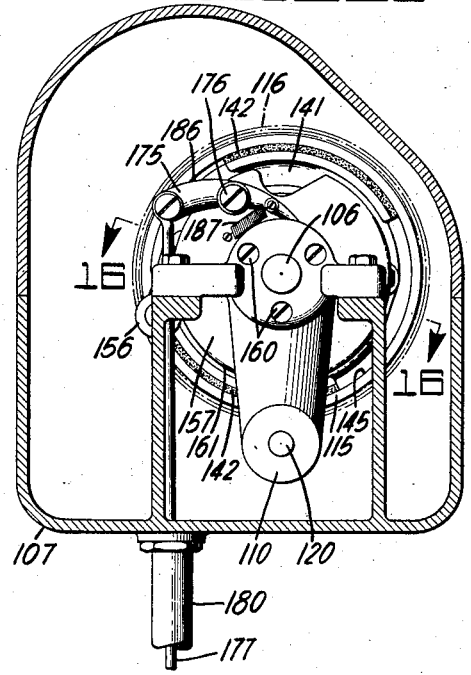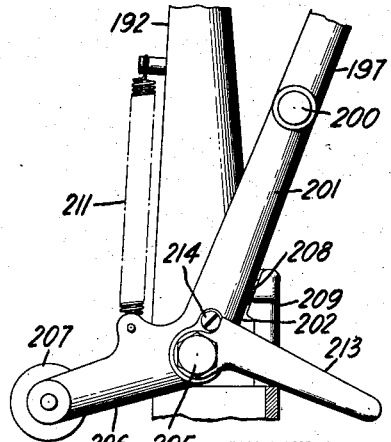

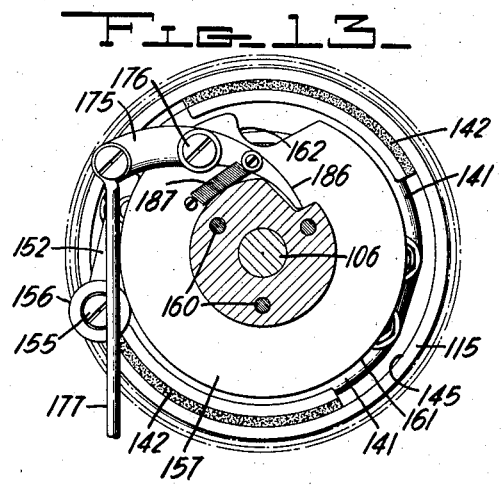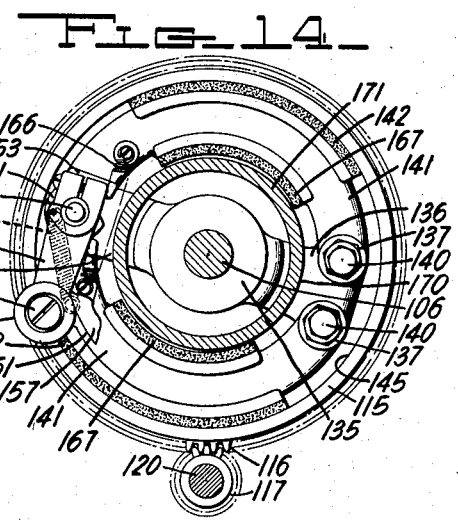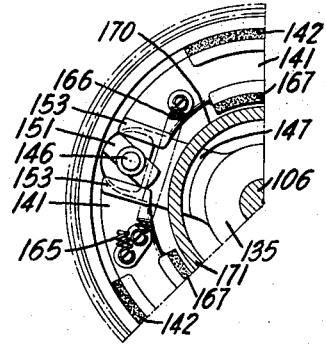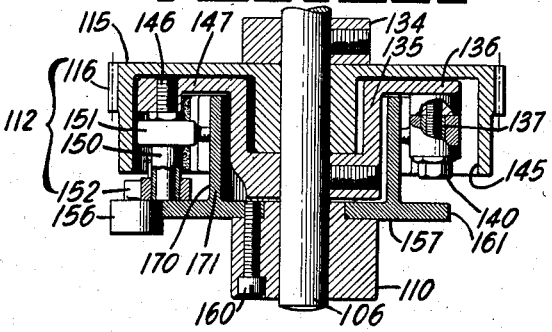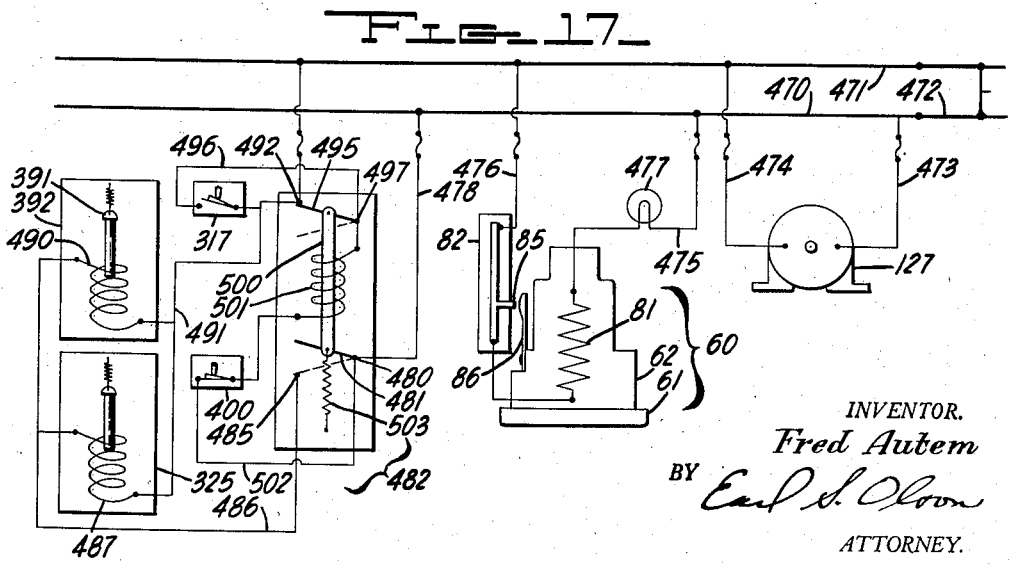

April 7, 1959 F. AUTEM 2,880,538
TRANSFER APPLYING MACHINE
Filed Oct. 18, 1954 11 Sheets-Sheet 7
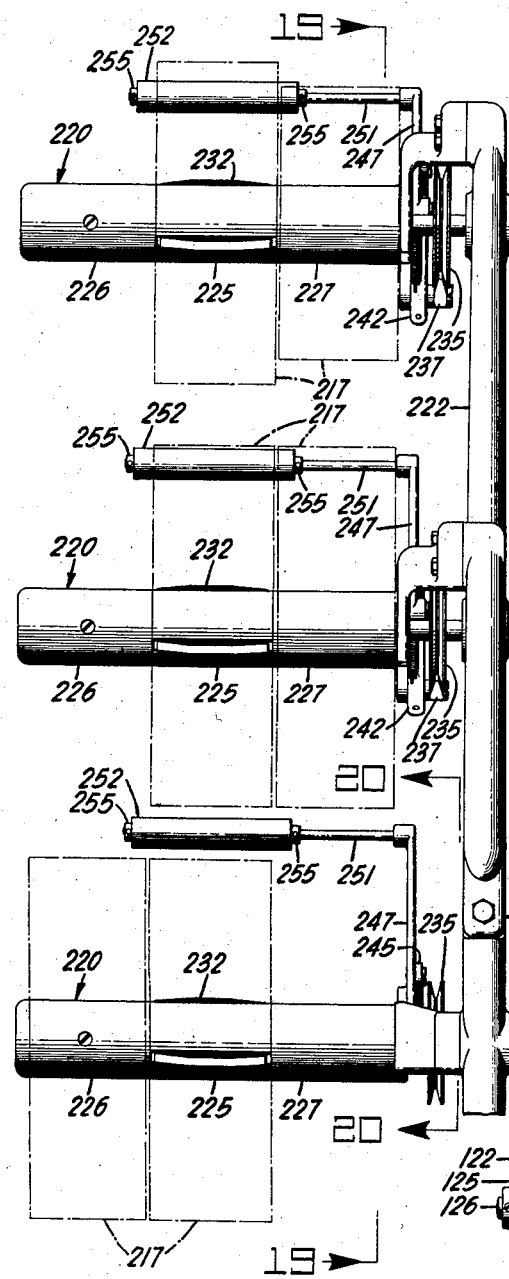
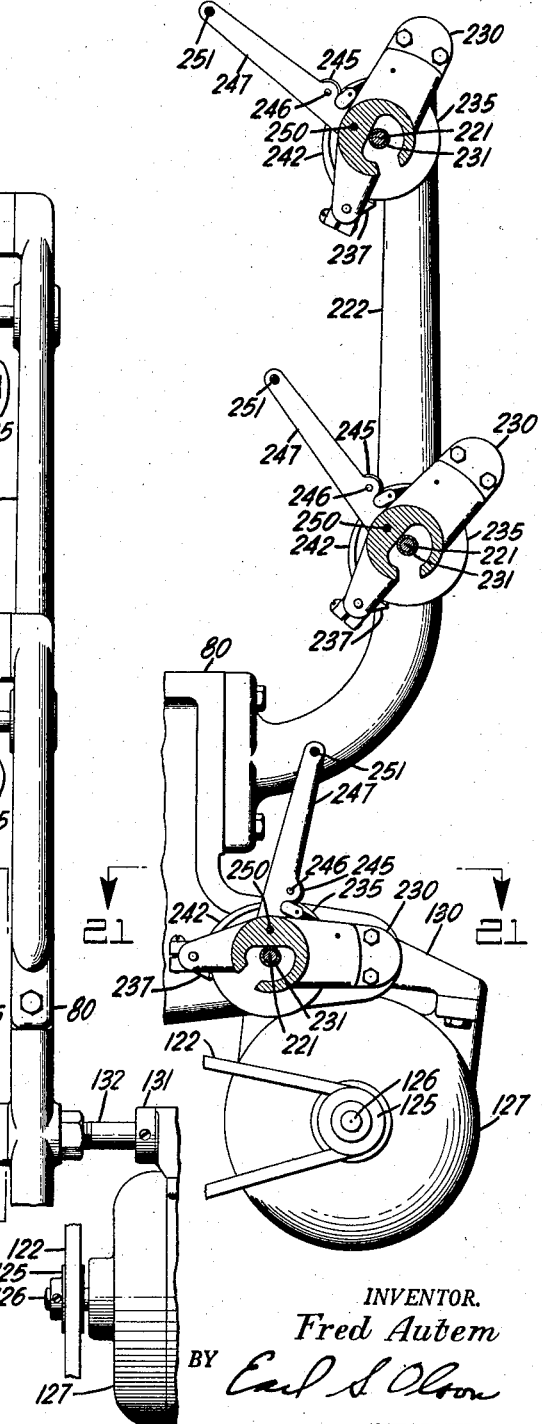
INVENTOR.
Fred Autem
BY Earl S. Olson
ATTORNEY.

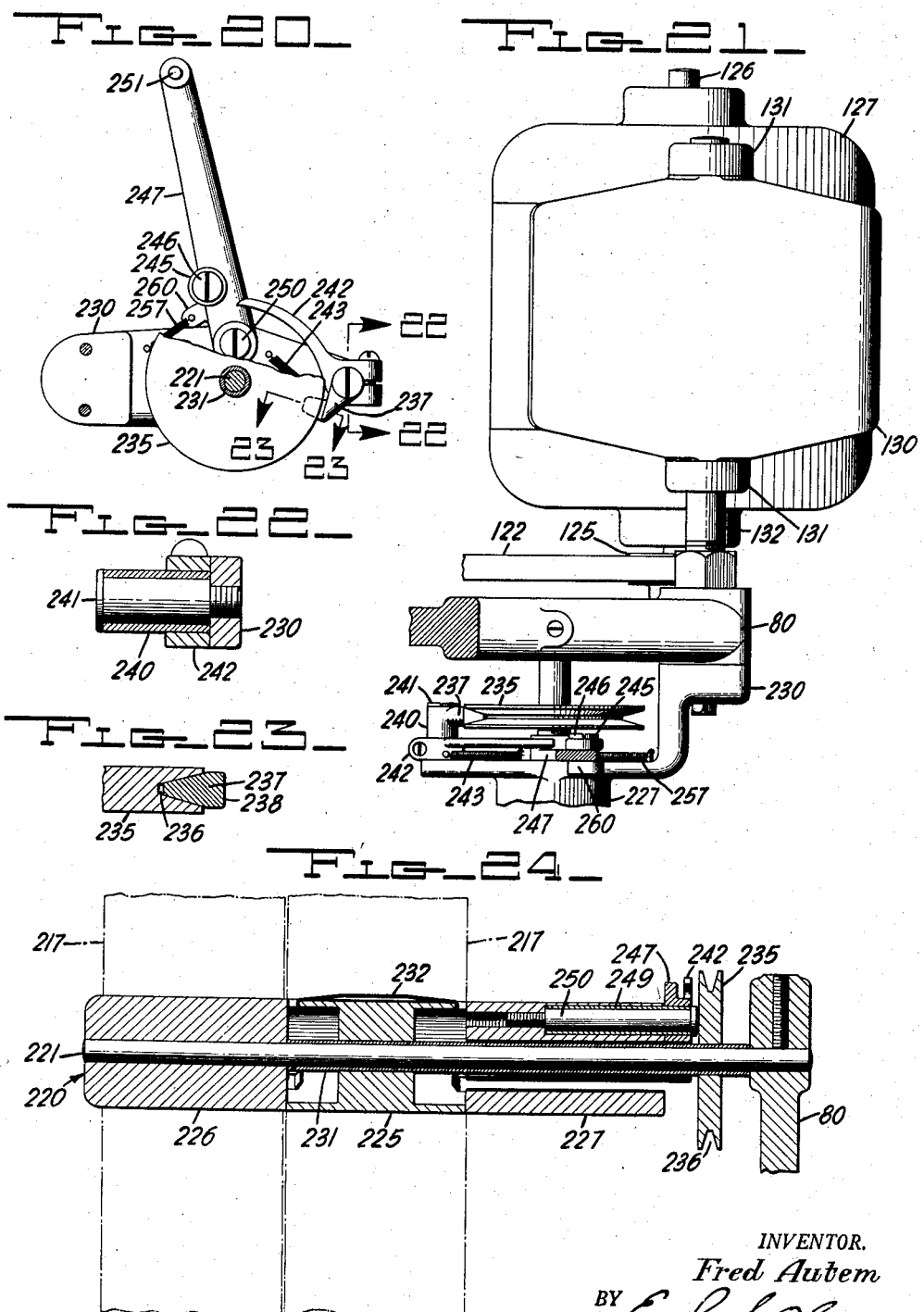

April 7, 1959  F. AUTEM  2,880,538
TRANSFER APPLYING MACHINE
Filed Oct. 18, 1954  11 Sheets-Sheet 9
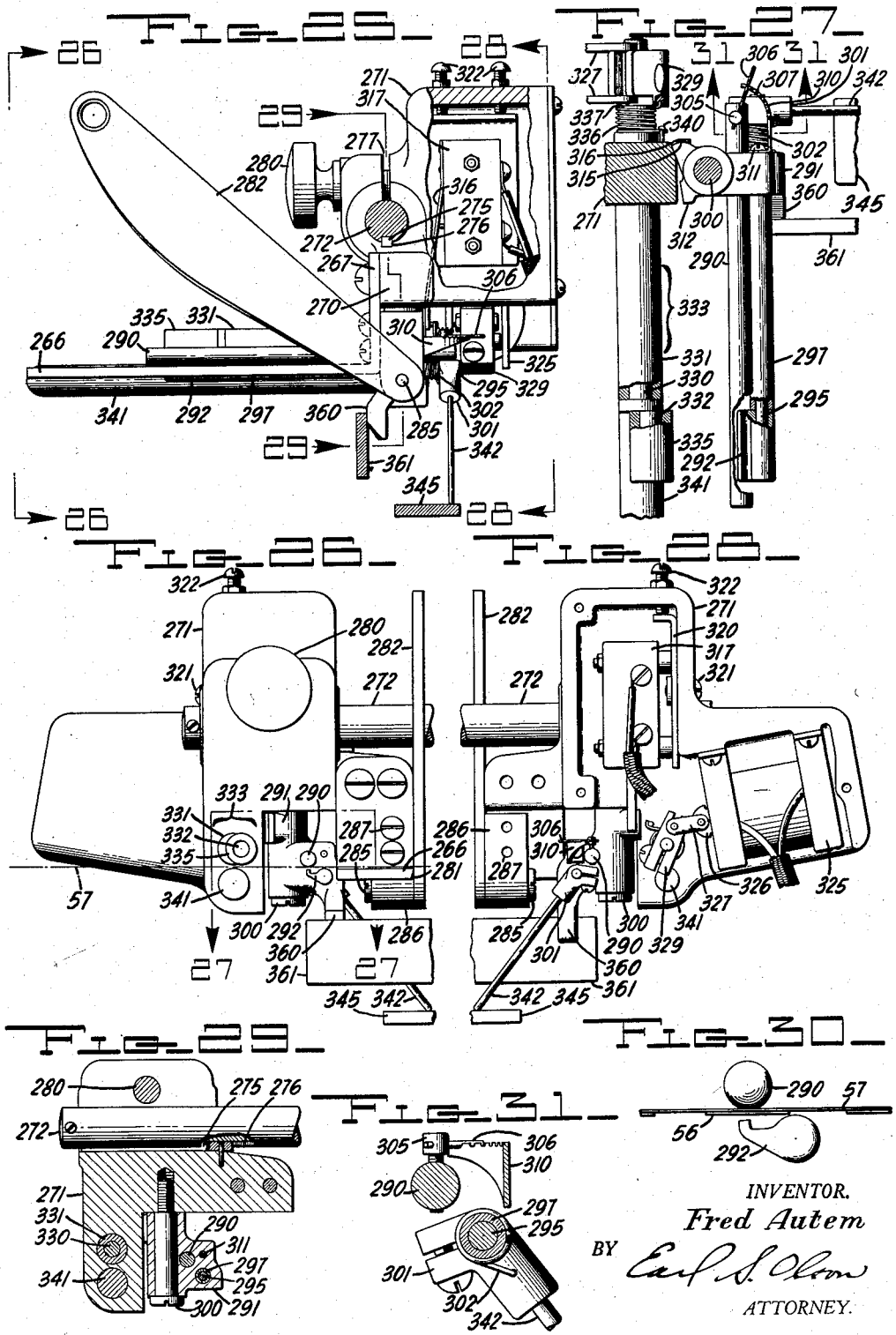
INVENTOR.
Fred Autem
BY
ATTORNEY.

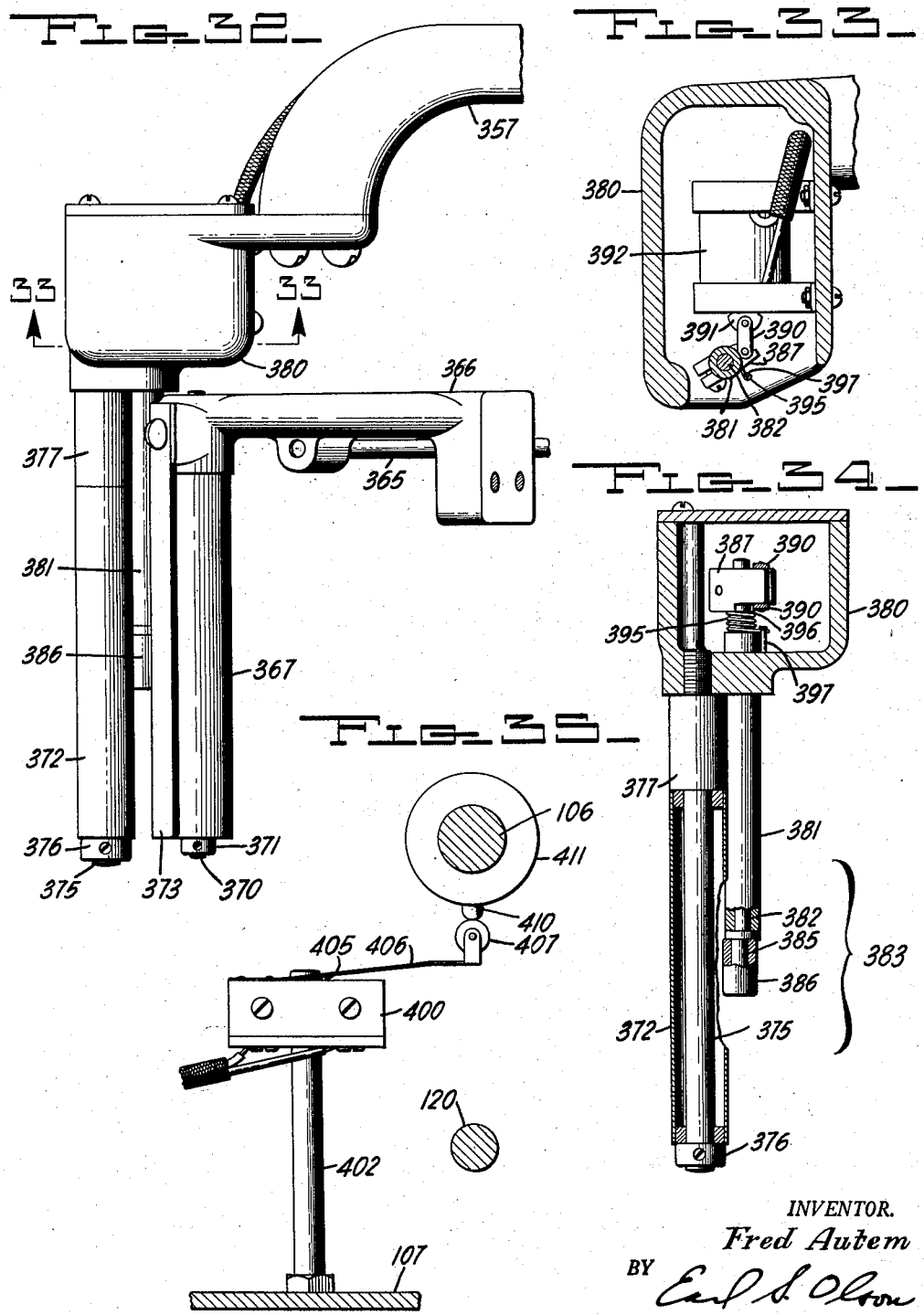

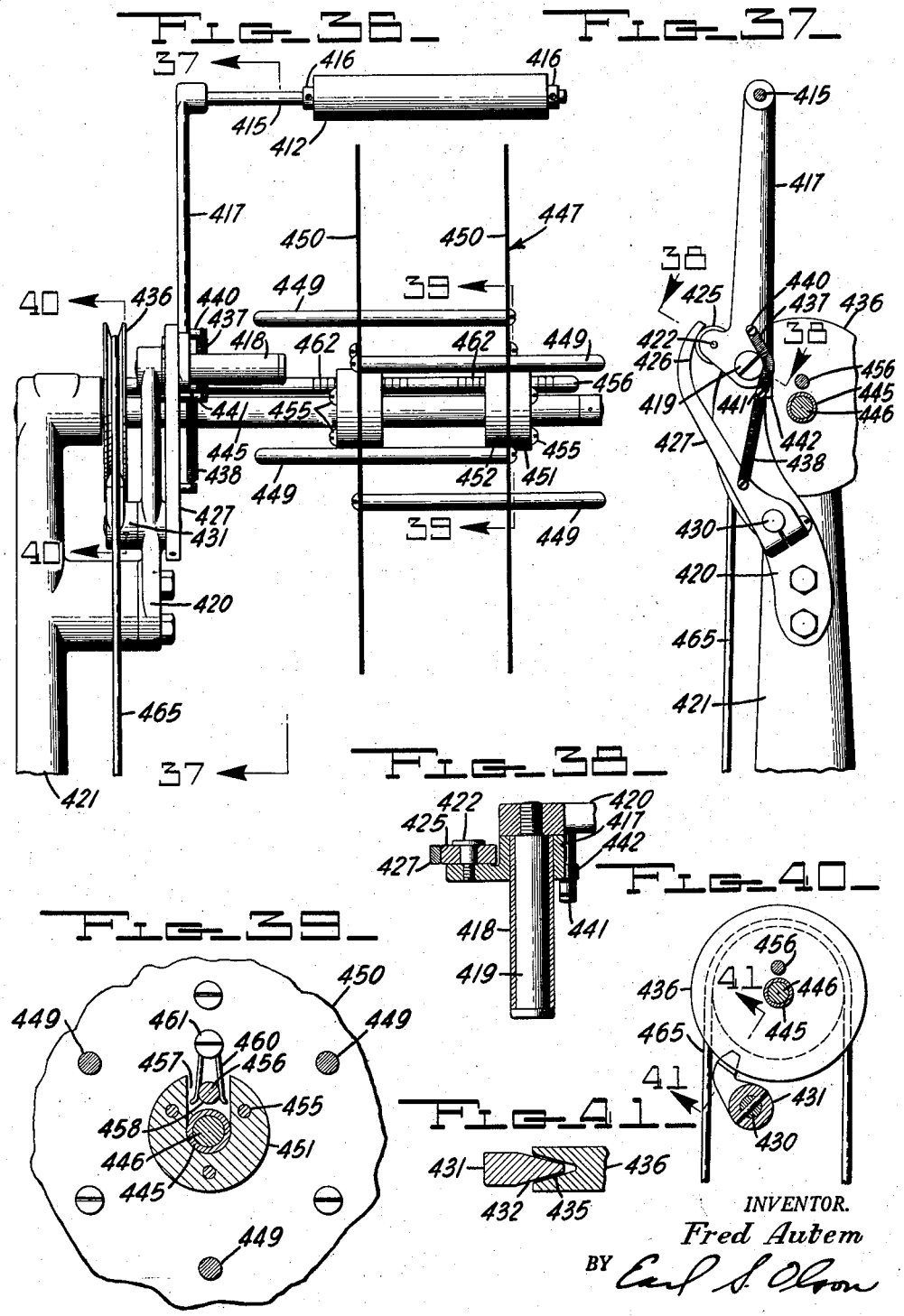

United States Patent Office 2,880,538
Patented Apr. 7, 1959

2,880,538

TRANSFER APPLYING MACHINE

Fred Autem, Mount Penn, Pa., assignor to Textile Machine Works, Wyomissing, Pa., a corporation of Pennsylvania Application October 18, 1954, Serial No. 462,975

15 Claims. (Cl. 41—1)

This invention relates to stamping devices for transferring indicia by heat and pressure from paper strip or ribbon to articles, for example, fabric articles such as hosiery and the like, and more particularly to improvements in the means for feeding the paper strip or ribbon in such devices.

In the present stamping devices, a heated stamp unit is provided which is moved from a non-stamping position to a stamping position to transfer indicia from a paper strip or ribbon to the articles. In certain of the devices the ribbon is passed between pressure feed rolls which are intermittently rotated to advance the ribbon to position successive indicia on the ribbon beneath the stamp unit for the transfer operation. Operations of the feed rolls to advance the ribbon is controlled by either electric or mechanical feeler means acting directly on the indicia to be transferred from the ribbon or on special markings carried on the ribbon. In many instances, direct engagement of the feeler means with the indicia causes damage to the indicia which results in the transfer of the defective indicia to the article. Also, the mechanical operation of the feed rolls could not be accurately correlated with the indicia feeler means which resulted in the irregular feeding of the ribbon and the inaccurate positioning of the indicia beneath the stamp unit.

In another stamping device the means for feeding the ribbon to the stamp unit includes mechanical means for gripping the ribbon which is operated by the movement of the stamp unit between stamping and non-stamping positions. In this latter device, difficulties are encountered in maintaining the necessarily fine adjustment of the feeding mechanism to compensate for the irregular spacing of the indicia on the ribbon which is caused by variations in atmospheric conditions affecting the length of the ribbon.

It is therefore an object of the invention to provide means in a stamping device to overcome the above mentioned and other difficulties occurring in feeding the indicia bearing ribbon to position the indicia in accurate relationship to the stamping means for transfer to the articles to be stamped.

Another object of the invention is to provide means to feed the indicia bearing ribbon in correlation with the movement of the stamp unit between stamping and non-stamping positions in a manner to accurately position the indicia in relation to the stamp unit.

Still another object of the invention is to provide means for holding and releasing the indicia bearing ribbon at the ribbon supply and ribbon take-up sides of the stamp unit and for correlating the action of the holding and releasing means with the movement of the stamp unit between stamping and non-stamping positions to feed the ribbon in a manner to accurately position the indicia in relation to the stamp unit.

A still further object of the invention is to provide means in a stamping device for withdrawing the indicia bearing ribbon from a supply source, feeding the ribbon to the stamp unit of the device and taking up the used paper, and controlling the withdrawing, feeding and take-up actions by the movement of the stamp unit between stamping and non-stamping positions.

With these and other objects in view which will become apparent from the following detailed description of the illustrative embodiment of the invention shown in the accompanying drawings, the invention resides in the novel elements, features of construction and cooperation of parts, as hereinafter more particularly pointed out in the claims.

In the drawings:

Figure 1 is a front elevational view of a stamping device, in inactive or non-stamping position, for transferring indicia from paper rolls to stockings or the like, the device having means for feeding the paper according to the invention;

Fig. 2 is a view on an enlarged scale of a portion of the device of Fig. 1 but shown in stamping position, parts being broken away to more clearly show other parts of the device;

Fig. 3 is an elevational view taken in the direction of the arrows 3—3 on Fig. 2;

Fig. 4 is a cross-sectional view taken substantially along the line 4—4 of Fig. 2;

Fig. 5 is a cross-sectional view taken substantially along the line 5—5 of Fig. 2;

Fig. 6 is a plan view on an enlarged scale of the mechanism shown in the upper portion of Fig. 3;

Fig. 7 is a cross-sectional plan view taken substantially along the line 7—7 of Fig. 3;

Fig. 8 is a cross-sectional view taken substantially along the line 8—8 of Fig. 6;

Fig. 9 is a cross-sectional view taken along the line 9—9 of Fig. 8;

Fig. 10 is an elevational view on an enlarged scale taken in the direction of the arrows 10—10 on Fig. 1, parts being shown in dotted outline and parts being broken away for purposes of illustration;

Fig. 11 is a cross-sectional view taken substantially along the line 11—11 of Fig. 10;

Fig. 12 is a view taken substantially along the line 12—12 of Fig. 10;

Fig. 13 is a cross-sectional view taken substantially along the line 13—13 of Fig. 10;

Fig. 14 is a cross-sectional view taken substantially on the line 14—14 of Fig. 10;

Fig. 15 is a view similar to a portion of Fig. 14, parts being omitted;

Fig. 16 is a cross-sectional view taken substantially along the line 16—16 of Fig. 11 and shown on an enlarged scale relative thereto;

Fig. 17 is a diagrammatic view of the electric circuit of the stamping device;

Fig. 18 is an elevational view taken in the direction of the arrows 18—18 on Fig. 1, parts being shown in dot-and-dash outline;

Fig. 19 is a view taken substantially along the line 19—19 of Fig. 18, parts being shown in elevation and others being shown in cross section;

Fig. 20 is a detailed elevational view taken in the direction of the arrow 20—20 of Fig. 18, a part being broken away to more clearly show others and parts being shown in cross section;

Fig. 21 is a plan view on an enlarged scale taken in the direction of the arrows 21—21 of Fig. 19, parts being shown in cross section;

Fig. 22 is a cross-sectional view taken along the line 22—22 of Fig. 20;

Fig. 23 is a cross-sectional view taken substantially along the line 23—23 of Fig. 20;

Fig. 24 is a cross-sectional view on an enlarged scale taken on the line 24—24 of Fig. 1, parts being shown in dot-and-dash outline;

Fig. 25 is a view, partially in section and parts being broken away, taken substantially along the line 25—25 of Fig. 2;

Fig. 26 is an elevational view taken in the direction of the arrows 26—26 of Fig. 25;

Fig. 27 is a cross-sectional view taken substantially on the line 27—27 of Fig. 26;

Fig. 28 is an elevational view taken substantially along the line 28—28 of Fig. 25;

Fig. 29 is a cross-sectional view taken substantially along the line 29—29 of Fig. 25;

Fig. 30 is a detailed view similar to a portion of Fig. 26 and shown enlarged relative thereto;

Fig. 31 is a cross-sectional view on an enlarged scale taken substantially on the line 31—31 of Fig. 27;

Fig. 32 is a plan view looking in the direction of the arrows 32—32 on Fig. 2 and shown enlarged relative thereto;

Fig. 33 is a cross-sectional view taken substantially along the line 33—33 of Fig. 32;

Fig. 34 is a cross-sectional view taken substantially along the line 34—34 of Fig. 2 and shown enlarged relative to Fig. 2;

Fig. 35 is a detailed elevational view taken in the direction of the arrows 35—35 on Fig. 4 and shown on an enlarged scale relative to Fig. 4, parts being shown in cross section;

Fig. 36 is an elevational view taken in the direction of the arrows 36—36 on Fig. 1 but shown enlarged relative to Fig. 1;

Fig. 37 is a detailed view taken along the line 37—37 of Fig. 36, parts being shown in elevation and others in cross section;

Fig. 38 is a cross-sectional view on an enlarged scale taken substantially along the line 38—38 of Fig. 37;

Fig. 39 is a cross-sectional view taken on the line 39—39 of Fig. 36;

Fig. 40 is a detailed elevational view taken along the line 40—40 of Fig. 36, parts being in cross section; and Fig. 41 is a cross-sectional view on an enlarged scale taken substantially along the line 41—41 of Fig. 40.

Referring to the drawings and particularly Figs. 1 and 2, the stamping device shown includes a table 50 having a top portion 51 supported on legs, one of which is shown at 52. In the instant arrangement, the articles to be stamped, such as stockings, are preferably placed in a pile 53 on the table, with the end of the pile folded over as indicated in Fig. 1. In the case of stockings, the ends are unfolded in pairs and placed on a plate member 55 which supports the end portions in position to receive an indicia 56 carried on a paper strip or ribbon 57 (Fig. 30). The indicia 56 is preferably of a type affected by heat and is pressed against and transferred to the article from the paper strip 57 by a heated stamp unit 60, shown in stamping position in Fig. 2. The stamp unit 60 comprises a foot member 61 secured to a shoe 62 which is carried in a sleeve portion 65 of a housing member 66 (Fig. 8). The shoe 62 is separated from the sleeve portion 65 by insulating material 67, such as asbestos, and the sleeve portion is split at 70, as shown in Figs. 3 and 7, and provided with bolts 71 by means of which the shoe is securely clamped in the sleeve portion. The housing member 66 is also securely clamped by the bolts 71 to a sleeve 72 carried in one arm 75 of a lever 76 pivotally mounted on a stud 77 carried in a frame member 80 which in turn is secured to the top portion 51 of the table 50 (Fig. 4).

The foot member 61 and shoe 62 are heated by a heater type resistor member 81 which is screw threaded into the shoe, as shown in Fig. 8. The resistor member 81 is in an electric circuit, hereinafter set forth, which also includes a normally closed limit switch 82 to control the heating action of the resistor member. The switch 82 is provided with a contact button 85 which is adapted to be engaged by a thermo-responsive element 86 of the bimetallic type secured to the shoe 62 (Fig. 8), to open the switch when the stamp unit has reached the desired temperature. The switch 82 is pivotally mounted in an extension 88 of the housing member 66 by means of a pin 87 and carries an angle shaped member 90 which is engaged by a spring pressed detent 91 to hold the member 90 against an adjusting screw 92 carried in a portion 93 of the extension of the housing member 66 (Figs. 7 and 8). The detent 91 and screw 92 permit the adjustment of the distance between the contact button 85 and element 86 whereby the temperature of the stamp unit may be varied as desired. A finger 97 secured to the portion 93 of the housing member 66 is adapted to engage a notched head portion 96 of the screw 92 to maintain the screw in adjusted position, as shown in Figs. 8 and 9. A thermometer 95, of the spiral bimetallic element type is carried in the shoe 62 (Fig. 3) to indicate the temperature of the stamp unit 60.

The lever 76 is pivoted on the stud 77 to move the stamping unit 60 from an inactive position shown in Fig. 1 to the active or stamping position shown in Fig. 2. For this purpose, the lever 76 has a second arm 100 which carries a stud 101 on which a follower 102 is rotatably mounted for engagement with a cam 105 carried on a camshaft 106. One end of the camshaft 106 is supported for rotation in one wall of a housing 107 forming part of the frame member 80 (Fig. 4) and the other end of the camshaft is supported in a bracket 110 secured to the housing 107 as shown in Figs. 10 and 11. A spring 111, connected between the stud 101 and the housing 107 maintains the follower 102 in engagement with the cam 105.

The camshaft 106 and cam 105 are intermittently rotated to operate the lever 76 to lower the stamp unit 60 to transfer position by a clutch device 112 which includes a drum 115 on the camshaft having gear teeth 116 (Figs. 14 and 16) meshing with the teeth of a pinion gear 117 fixed on a drive shaft 120. The drive shaft 120 is rotatably mounted in the housing 107 and the bracket 110 and, as shown in Figs. 1, 4 and 10, carries a pulley 121 which is connected by a belt 122 or the like to a pulley 125 fixed on a shaft 126 of an electric motor 127. The motor 127 is secured to and supported by a bracket 130 which is pivotally mounted between the collars 131 on a shaft 132 carried in the frame member 80 (Figs. 18 and 21). As shown in Figs. 1 and 19, the length of the belt 122 is such that the motor 127 is held to the left of its center of gravity whereby the weight of the motor acts as a tensioning means to maintain the belt taut. With this arrangement when the motor 127 is in operation, the drum 115 is continuously rotated.

The drum 115 is freely rotatable on the camshaft 106 between a collar 134 and a support member 135 both of which are fixed on the camshaft (Fig. 16). One arm 136 of the support member 135 carries bolts 140 for adjustably mounting eccentric bushings 137 (Figs. 14 and 16). Each of the eccentric bushings 137 acts as a pivotal mounting for one end of a brake shoe 141 having a brake band 142 of leather or the like, secured to the outer edge thereof for engagement with an inner surface 145 of the drum 115. A stud 146 carried in a second arm 147 of the support member 135 pivotally carries a sleeve 150 having a camming portion 151 which is adapted to engage free end portions 153 of the brake shoes 141 (Fig. 15) to force the brake linings 142 against the inner surface 145 of the drum 115 to thereby connect the shaft 106 to the drum 115 to turn therewith. A cam lever 152 fixed on the sleeve 150 rotatably carries a stud 155 which rotatably carries a roller type follower 156 for engagement with a disc 157 secured to the bracket 110 by screws 160, the follower overhanging one side face of the disc, as shown in Fig.

16. The disc 157 is provided with a high concentric portion 161 and a notch 162 into which the follower 156 is adapted to drop as hereinafter set forth.

When the follower 156 rides into the notch 162 in the disc 157, the lever 152 and sleeve 150 are turned counterclockwise by means of a spring 165 which is connected between the lever and the lower brake shoe 141 as shown in Figs. 14 and 15, and the camming portion 151 of the sleeve is disengaged from the end portions 153 of the brake shoes. At this time a spring 166, connected between the brake shoes 141, draws the brake shoes toward each other to engage a brake band 167, secured to the inner edge of each brake shoe, with an outer surface 170 of a sleeve portion 171 of the disc 157 surrounding the hub of the support member 135, as shown in Fig. 16. With the brake bands 167 in engagement with the sleeve portion 171 the support member 135 and camshaft 106 are held stationary which occurs when a high portion 172 of the cam 105 is in engagement with follower 102 and the lever 76 and stamp unit 60 are in the raised position of Fig. 1.

In order to release the brake bands 167 from holding engagement with the sleeve portion 171 and to engage the brake bands 142 with the drum 115 to rotate the camshaft 106, the follower 156 must be lifted out of the notch 162 and raised to the level of the high portion 161 of the disc, which action turns the camming portion 151 into engagement with the end portions 153 of the brake shoes 141 to spread the shoes. For lifting the follower 156 out of the notch 162 there is provided a lever 175 which is pivotally carried, substantially midway between its ends, on a stud 176 fixed on the disc 157 (Fig. 13). One end of the lever is normally positioned beneath the lowest portion of the notch 162 in the disc 157 (Fig. 13) and the follower 156 when it is in the notch. The other end of the lever 175 is pivotally connected to one end of a rod 177 which extends downwardly through a tube 180 secured to the housing 107 and a foot bracket 181, the tube and bracket acting as an additional support for the housing. The other end of the rod 177 is adjustably connected to a foot treadle 182 pivotally mounted on a bracket 185 carried on one of the legs 52, as shown in Fig. 1.

As shown in Figs. 11 and 13, an upper surface 186 of the lever 175 has a curvature substantially the same as the high portion 161 of the disc 157. Therefore, when the foot treadle 182 is depressed to turn the lever 175 counterclockwise about the stud 176 the lever engages the overhanging portion of the follower 156 and lifts it to the level of the high portion 161 of the disc 157. At this time the upper surface 186 of the lever 175 coincides with the surface of the high portion 161 of the disc 157 and as the support member 135 and camshaft 106 are rotated with the drum 115, the follower 156 rides along both the surface 186 and high portion 161. As the follower 156 passes the end of the lever 175 and with the foot treadle 182 released, a spring 187 connected between the lever and disc 157, turns the lever clockwise to its position of Fig. 13 and the foot treadle to a raised inactive position, as shown in Fig. 1.

As previously explained, where flexible articles such as stockings or other garments are to receive the indicia they are preferably placed in a folded pile on the table 50 in such position that as each article is unfolded by the operator its end will rest on plate member 55 and underlie the stamp unit at the point where the indicia is desired. After the indicia transfer or stamping operation the end must be removed from the plate member to permit the next article in the pile to be unfolded and placed in position to receive the indicia. To accomplish this automatically an opening 215 is provided in the table 50 opposite plate member 55 and the plate member is carried on an arm 190 pivotally mounted on a pin 191 carried in a bracket 192 secured within the housing 107 and extending through an opening 195 in the housing, as shown in Figs. 2, 3 and 10. The arm 190 is connected by a stud 196 to one end of a link 197 the other end of which is connected by a stud 200 to one arm 201 of a lever 202 pivotally carried on a stud 205 fixed in the bracket 192 (Fig. 12). The lever 202 has a second arm 206 which rotatably carries a follower 207 for engagement with a cam 210 on the camshaft 106 (Fig. 2). A spring 211 connected between the arm 206 and the bracket 192 (Fig. 12) biases the arm 201 against a stop 208 carried in a portion 209 of the bracket, the stop acting to limit the movement of the arm 206 and follower 207 toward the camshaft 106. As the lever 76 and stamp unit 60 is raised to the position of Fig. 1 after each stamping operation, a high portion 212 of the cam 210 engages the follower 207 to turn the lever 202 clockwise as viewed in Fig. 2 or counterclockwise about the stud 205, as viewed in Fig. 12, to lower the arm 190 and plate member 55 about the axis of the pin 191 which permits the end of the article formerly on the plate member to drop through the opening 215 and against a guard member 216 secured to the table (Figs. 1 and 2).

A handle 213 also pivotally mounted on the stud 205 is adapted to engage a pin 214 carried in the lever 202 (Fig. 12) whereby the lever may be manually moved to lower the plate member 55 when desired. When all of the articles in a pile are stamped, the ends of the articles are withdrawn through the opening and the pile removed and a new pile folded and placed on the table 50 in position to be stamped.

As shown in Fig. 1, means are provided to support a plurality of rolls 217 of the indicia bearing ribbon 57 from any one of which the ribbon may be fed along a path passing beneath the stamp unit 60. The rolls 217 are carried on spindle devices 220, three of which are shown in Figs. 1 and 18, which are mounted on rods or shafts 221. The upper two shafts are fixed in a bracket 222 secured to the frame member 80 and the other shaft 221 is carried directly in the frame member (Figs. 18, 19 and 24). As shown in dot-and-dash outline in Figs. 18 and 24, two rolls may be carried by each spindle. Each of the spindle devices are the same in construction and therefore like parts will have like reference characters in order to avoid a detailed description of each device.

The spindle device 220, the lowermost one of which is shown in detail in the figures, includes a roller portion 225 mounted on the shaft 221 between an end portion 226 held in fixed stationary position on the shaft and a stationary end portion 227 forming part of a bracket member 230 secured to the frame member 80 (Figs. 18 and 21). The center portion 225 and end portions 226 and 227, respectively, are cylindrical in outline and of substantially the same diameter to interfit an aperture in each roll as shown in Fig. 24. The roll 217 from which the ribbon 57 is drawn for the stamping operation is mounted on the center portion 225 which is secured, as by press fitting, on a sleeve 231 rotatable on the shaft 221 between the end portion 226 and the frame member 80. The roll 217 is frictionally held on the center portion 225 to rotate therewith by spring members 232 which are releasably attached at spaced points along the periphery of the center portion. A disc 235, also secured to the sleeve 231 by press fitting, is provided with a V-shaped notch 236 in its outer peripheral edge which is adapted to be engaged by a correspondingly shaped end 238 of a brake arm 237 (Figs. 21 and 23). The brake arm 237 is formed on a sleeve-like member 240 pivotally mounted on a stud 241 fixed in the bracket member 230, as shown in Figs. 21 and 22. A spring 243 connected between the brake arm 237 and the member 230 tends to bias the end 238 of the brake arm into the notch 236 in the disc 235.

An arm 242 fixed on the member 240 is adapted to be engaged and operated by a roller 245 to turn the member and brake arm 237 counterclockwise, as viewed in Fig. 20, to release the end 238 from the notch 236 in the disc 235 and thereby permit the sleeve 231, center portion 225 and roll 217 thereon to rotate to unwind the ribbon 57 from the roll. The roller 245 is rotatably carried on a stud 246 fixed on a tension lever 247 which is in turn fixed on a sleeve 249 pivotally mounted on a stud or bolt 250 carried in the end portion 227 of the bracket member 230 (Fig. 24). The free end of the tension lever 247 carries a rod or shaft 251 which rotatably carries a roller 252 over which the ribbon 57 passes from the roll 217, the roller 252 being positioned on the shaft between collars 255 fixed thereon. A spring 257 connected between an arm 260 of the lever 247 and the bracket member 230 biases the lever counterclockwise, as viewed in Fig. 20, to a rest position in which the arm engages the bracket member, when no ribbon passes over the roller 252.

As shown in Figs. 1, 2 and 4 the ribbon 57 is drawn from a roll 217, which in the instance illustrated is mounted on the upper spindle device 220, and follows a path over the roller 252 on the tension lever 247, under a roller 261 rotatably carried on the frame member 80 and beneath a guide surface 262 on the lever 76. The path of the ribbon 57 extends from the guide surface and over a horizontally extending plate portion 266 of a bracket member 267 (Figs. 25 and 26) secured to a portion 270 of a housing 271 carried on a support rod 272 secured to the lever 76, as shown in Figs. 2 and 4. The housing 271 carries a key 275 which interfits in a keyway 276 in the rod 272 (Figs. 25 and 29) permitting the housing to be adjusted axially of the rod. The housing 271 is slotted at 277 and is provided with a thumb screw 280 for clamping the housing in adjusted position on the rod 272. The plate portion 266 has an undercut edge 281 which cooperates with a corresponding edge on a knife blade 282 for severing the ribbon 57 of one roll 217 when a different roll is to be used. The knife blade 282 is carried on the end of a stud 285 pivotally mounted in a bearing block 286 secured to the bracket member 267 by screws 287.

The ribbon 57 passes between a guide rod 290 fixed in a control member 291, as by press fitting, and a feeler finger 292 carried at one end of a rod 295 (Figs. 26, 27 and 30) mounted for rotating movement in a bushing or sleeve 297 fixed in the control member. The control member 291 is pivotally mounted on a stud 300 carried in the housing 271, as shown in Fig. 29. The end of the rod 295 extends through and beyond the sleeve 297 and has a member 301 fixed thereto. A tension spring 302 surrounding the sleeve 297 and having its ends connected to the control member 291 and member 301, respectively, tends to bias the member 301, rod 295 and feeler finger 292 clockwise toward the ribbon 57, as viewed in Figs. 26 and 30, to permit engagement of the indicia carried by the ribbon with the feeler finger, as and for the purpose hereinafter set forth. Clockwise movement of the rod 295 is controlled by engagement of the member 301 with the end of a screw 305 carried in a portion of the guide rod 290 extending beyond the control member 291 (Figs. 27 and 31). The screw 305 is adjustable in the rod 290 and carries a pin 306 for engagement with a notched edge 307 of a curved plate member 310 secured by a screw 311 to the control member 291, the notched edge maintaining the screw 305 in adjusted position.

The control member 291 is provided with a stop portion 312 which is adapted to engage a portion of the housing 271 to limit the clockwise movement of the control member as viewed in Fig. 27. The control member 291 also is provided with a camming portion 315 for engagement with a leaf spring 316 of a limit switch 317 carried on a plate 320 which is pivotally mounted in the housing 271 on a screw 321. Screws 322 carried in the housing 271 (Figs. 25 and 28) adjustably position the plate 320 on the screw 321. The limit switch 317 is of the normally open type and has a button which is adapted to be engaged by the leaf spring 316, when the spring is depressed, to close the switch. The switch 317 is in an electric circuit including a solenoid 325 carried in the housing 271 and having a core member 326, the solenoid being energized to hold the core member in its right hand position (Fig. 28) when the switch 317 is open as hereinafter set forth. The core member 326 is pivotally connected by links 327 to a lever 329 secured to one end of a shaft 330 rotatably mounted in a sleeve or hub 331 secured in the housing 271. The shaft 330 forms a part of a clamping means 333 and to this end is provided with a shaft portion or extension 332 projecting from an enlarged end portion of shaft 330 with an axis eccentric to the axis of the shaft 330. The extension 332 has secured thereto, a sleeve member 335 of pliable material, such as rubber or the like. A torsion spring 336 surrounding a portion 337 of reduced diameter of the hub 331 has one end connected to the lever 329 and its other end anchored by a pin 340 in the housing 271 to bias the lever and rotate the shaft 330 clockwise as viewed in Fig. 26 and counterclockwise as viewed in Fig. 28. Clockwise rotation of the shaft 330 moves the member 335 into engagement with a rod 341 fixed in the housing 271 to clamp the ribbon 57 which passes between the member and rod.

When the stamping unit 60 is in its lower or stamping position, as shown in Fig. 2, the shaft 295 is moved counterclockwise, as viewed in Fig. 26, to move the feeler finger 292 out of the path of the indicia on the ribbon 57 during the initial part of the feeding movement of the ribbon as hereinafter set forth. For moving the shaft 295 and feeler finger 292 counterclockwise the member 301 carries a finger 342 which is adapted to engage a plate-like portion 345 of a lever 346 pivotally mounted on the stud 77 between the lever 76 and the frame member 80 (Figs. 2 and 4). The lever 346 is rotated to different positions on the stud 77 to adjust the plate-like portion 345 relative to the finger 342 to vary the length of time that the feeler finger 292 is disengaged from the ribbon 57, for purposes hereinafter set forth. For maintaining the portion 345 in adjusted position, the lever 346 is provided with a handle 347 which carries a cage member 350 for a ball detent 351 (Fig. 5). The ball detent 351 is biased by a spring 352 into engagement with a series of spaced apertures 355 in a plate 356 secured to a bracket 357 carried on the frame member 80 (Figs. 2 and 4).

As the lever 76 is turned clockwise, as viewed in Fig. 2, to move the stamping unit 60 to raised position, the finger 342, feeler finger 292 and rod 295 are turned clockwise by the spring 302 until the member 301 engages the screw 305. At this time the solenoid 325 is energized by means hereinafter set forth and the shaft 330 rotated to its counterclockwise position (Fig. 26) to release the member 335 from clamping engagement with the ribbon 57. As the ribbon 57 is advanced toward the stamp unit 60, an indicia on the ribbon engages the feeler finger 292 and turns the control member 291 clockwise on the stud 300, as viewed in Fig. 27. Clockwise movement of the control member 291 moves the camming portion 315 to depress the leaf spring 316 to close the limit switch 317 which deenergizes the solenoid 325 and the spring 336 rotates the shaft 330 and member 335 of the clamp means 333 clockwise to engage and clamp the ribbon 57 against the rod 341 to stop further advance of the ribbon. When the stamp unit 60 is again moved to stamping position, the finger 342 engages the portion 345 to turn the feeler finger 292 counterclockwise and a camming projection 360 on the control member 291 engages a plate 361, fixed on the housing 107 (Figs. 2 and 25), to turn the control member counterclockwise, to return the guide rod 290 and rod 295 to the position of Fig. 27.

From the rod 341 the ribbon 57 passes beneath the stamping unit 60, where the indicia is transferred to the articles being stamped, and beneath a horizontally extending finger portion 362 of a guide rod 365 carried in a bracket 366 secured to the arm 75 (Figs. 2 and 3). As shown in Fig. 1, the finger portion 362 of the guide rod 365 holds the ribbon 57 out of contact with the foot member 61 when stamp unit 60 is in its raised position. The used ribbon 57 follows a path upwardly from the finger portion 362 and over a roller 367 rotatably mounted on a shaft 370 fixed in the bracket 366, the roller being held between the bracket and a collar 371 secured on the shaft (Figs. 2, 6 and 32). A flat plate spring 373 on the bracket 366 presses the ribbon against the roller 367 to provide a slight drag on the ribbon as it passes over the roller. From the roller 367 the ribbon 57 is guided around a roller 372 which is rotatably mounted on a stud 375 between a collar 376 fixed on the stud and an enlarged portion 377 of the stud. The stud 375 is carried in a housing member 380 secured to the bracket 357 (Figs. 32 and 34). A sleeve or hub 381 supported by the housing 380 rotatably carries a shaft 382 forming a part of a clamping means 383. The shaft 382 has an eccentric end portion 385 which is provided with a sleeve member 386 (Fig. 34) of a pliable material similar to the member 335. The other end of the shaft 382 carries a lever 387 which is pivotally connected by links 390 to a core member 391 of a solenoid 392 mounted in the housing 380 (Fig. 33). The solenoid 392 when energized, as hereinafter set forth, turns the shaft 382 and the member 386 on the eccentric end portion 385 counterclockwise to engage and clamp the paper strip 57 against the roller 372, as shown in Fig. 2. When the solenoid 392 is deenergized, a torsion spring 395 surrounding a reduced end portion 396 of the sleeve 381 and connected to the lever 387 and a pin 397 carried in the housing 380, turns the shaft clockwise, as viewed in Fig. 2, to disengage the roller 386 from its clamping engagement with the ribbon 57.

The solenoid 392 is in an electric circuit, hereinafter set forth, including a normally closed limit switch 400 which is secured to a support bracket 401 adjustably carried on a rod 402 mounted in the housing 107 (Figs. 4 and 35). The switch 400 is provided with a button 405 which is adapted to be engaged by a spring plate 406 secured to the switch. The spring plate 406 rotatably carries a follower 407 which is engaged by a button 410 on a collar 411 fixed on the camshaft 106 and rotatable therewith to operate the button 405 to open the switch 400 and energize the solenoid 392.

The ribbon 57 extends along a path from the roller 372 and over a roller 412 rotatably mounted on a rod or shaft 415 between collars 416 adjustably carried on the shaft (Figs. 1 and 36). The shaft 415 is carried in the end of a tension lever 417 secured on a sleeve 418, as by press fitting, which is pivotally mounted on a stud 419 (Fig. 38) fixed in a bracket member 420 secured to an arm 421 of the bracket 357 (Figs. 2 and 37). The lever 417 carries a stud 422 on which a roller 425 is rotatably mounted for engagement with a curved surface 426 of a brake lever 427 fixed on one end of shaft 430 pivotally carried in the bracket member 420. A brake member 431 fixed on the other end of the shaft 430 has a V-shaped end portion 432 which is adapted to engage in a correspondingly shaped groove 435 in a pulley 436 (Figs. 40 and 41). The pulley 436 is fixed on a sleeve 445, as by press fitting, which is rotatably mounted on a shaft 446 secured in the arm 421. A spring 437 connected between a pin 440 on the lever 417 and a pin 441 on the bracket member 420 tends to bias the lever clockwise and a spring 438 connected between the pin 441 and the brake lever 427 biases the brake lever clockwise, as viewed in Fig. 37. A projection 442 on the lever 417 is adapted to engage the pin 441 to limit the clockwise movement of the lever 417 when no ribbon 57 passes over the roller 412.

From the tension lever 417 the used ribbon 57 extends to and is wound upon a reel device 447 carried on and rotatable with the sleeve 445. The reel device 447 includes a pair of like flanges 450 each of which carry spaced pins 449 slidably interfitting in apertures in the other flange and on which the paper strip is wound. Each flange is mounted between collars 451 and 452 which are secured to each other and to the flange by screws 445 (Figs. 36 and 39). The flanges 450 and collars 451, 452 are slidably mounted on the sleeve 445 for movement toward and away from each other whereby the distance between the flanges may be adjusted to accommodate paper strips of different widths and to permit withdrawal of one or both flanges from the sleeve to remove the used ribbon wound on the pins 449. The flanges 450 are rotated with the sleeve 445 and pulley 436 by a pin 456 fixed in the pulley and slidably interfitting in apertures 458 in the flanges 450 and collars 452. Each collar 451 is provided with a slot 457 for the reception of an open end portion of a substantially U-shaped spring clip 460 which is secured to the flange 450 by a screw 461 (Fig. 39). The spring clips 460 are adapted to engage in grooves 462 in the pin 456 to maintain the flanges 450 in adjusted position on the sleeve 445. The pulley 436 is frictionally driven, when the brake member 431 is released from the groove 435, as hereinafter set forth, by a belt 465 which is connected between the pulley 436 and a pulley 466 on the camshaft 106, to rotate the reel device 447 when the camshaft is rotated, to wind the used ribbon on the reel device. When the brake member 431 is engaged with the pulley 436 or when the brake member is released from the pulley and the reel device has taken up the slack used ribbon, the belt 465 slips in the groove 435 of the pulley.

The electrical circuit hereinbefore referred to and diagrammatically shown in Fig. 17, includes main conductors 470 and 471 connected to the main electrical source by a switch 472. The motor 127 is connected to the main conductors through leads 473 and 474. The resistor member 81 for heating the foot member 61 and the limit switch 82 are connected to the main conductors 470 and 471 by leads 475 and 476. A signal light 477 is provided in the lead 475 to indicate when the circuit through the resistor 81 is closed to heat the foot member 61.

A lead 478 is connected between the main conductor 470 and one side or contact 480 of a switch 481 forming part of a relay 482. The other side or contact 485 of switch 481 is connected by a lead 486 to a core winding or coil 487 for the solenoid 325 and to a core winding or coil 490 of the solenoid 392. The coils 487 and 490 are connected by a lead 491 through one side or contact 492 of a second switch 495 of the relay 482 to the main conductor 471. The normally open limit switch 317 is connected to the lead 491 by a lead 496 which also connects the other contact 497 of the switch 495. The switches 481 and 495 are connected to a core member 500 operated by a core winding 501 which is connected by a lead 502 from the contact 497 through the normally closed limit switch 400 to the contact 480 of the switch 481.

In order to start and operate the stamping device through one or a series of stamping cycles, the switch 472 is closed which energizes and starts the motor 127 and drive shaft 120 and energizes the resistor member 81 to heat the foot member 61 of the stamp unit 60 and signal light 477 to indicate that the foot member is being heated. At this time the circuit through the coil 501 is closed at the switch 495 and the circuit through the switch 481 is open to deenergize the coils 487 and 490 of the solenoids 325 and 392, respectively. With the solenoids 325 and 392 deenergized, the shaft 330 and members 335 of the clamp means 333 are positioned to clamp the paper strip 57 between the stamp unit 60 and a supply roll 217 and the shaft 382 and member 386 of the clamp means 383 are positioned to release the paper strip between the stamp unit and the reel device 447. Also, at this time the follower 156 is in the notch 162 of the disc 157 and the brake bands 167 are in engagement with the sleeve portion 171 of the disc to hold the camshaft 106 stationary, with the high portion 172 of the cam 105 in engagement with the follower 102 to hold the lever 76 and stamp unit 60 in raised position as shown in Fig. 1.

When the foot member 61 is heated to the desired temperature, which is indicated by the thermometer 95 and when the circuit through the resistor 81 and switch 82 is opened, which is indicated when the light 477 is out, the foot treadle 182 may be depressed to start the stamping cycle. Depressing the foot treadle 182 turns the lever 175 counterclockwise (Fig. 13) to move the follower 156 to the level of the high portion 161 of the disc 157 and thereby turn the lever 152 and sleeve 150 clockwise. Clockwise movement of the sleeve 150 turns the camming portion 151 to engage the ends 153 and spread the brake shoes 141 to engage the brake bands 142 with the inner surface 145 of the drum 115 to thereby connect the camshaft 106 to the drive shaft 120 to turn therewith. As the follower 102 rides from the high portion 172 to the low portion of the cam 105, the lever 76 is turned counterclockwise to lower the foot member 61 toward stamping position. As the distance between the rollers 367 and 372 is shortened the tension lever 417 is biased clockwise (Fig. 1) to take up the slack in the ribbon 57. When the roller 425 on the lever 417 engages the curved end 426 of the brake lever 427 (Fig. 37) to release the brake member 431 from the pulley 436 (Fig. 41) the belt 465 drives the pulley to wind the ribbon on the reel device 447 (Fig. 36).

When the stamp unit 60 nears the lowermost or indicia transferring position, the finger 342 engages the portion 345 to turn the rod 295 and feeler finger 292 counterclockwise out of the path of the indicia 56, as viewed in Figs. 26 and 30, and hold them in such position until the stamp unit is again raised to remove the finger 342 from portion 345 whereby the indicia 56 on the ribbon 57 may during such interval as will be later explained, pass between the feeler finger and guide rod 290 without engaging the feeler finger. Also as the stamp unit nears the transferring position, the camming projection 360 on the control member 291 engages the plate 361 to turn the control member, rod 295 and feeler finger 292 counterclockwise as viewed in Fig. 27. After the stamp unit reaches the transferring position of Fig. 2, the button 410 on the collar 411 engages the spring plate 406 to open the limit switch 400 which opens and deenergizes the electric circuit through the coil 501 of the relay 482. With the coil 501 deenergized, a spring 503 operates the core member 500 to open the switch 495 and close the switch 481 thereby closing and energizing the circuit through the coils 487 and 490. Energizing the coils 487 and 490 of the solenoids 325 and 392, respectively, operates the solenoids 325 to open the clamp 333 to release the ribbon 57 between the stamp unit 60 and the supply roll 217 and operates the solenoid 392 to close the clamp means 383 to hold the ribbon between the stamp unit and reel device 447.

The stamp unit 60 is maintained in stamping position only through an interval sufficient to transfer the indicia 56 from the ribbon 57 to the fabric and as the camshaft 106 continues to rotate the button 410 disengages the spring plate 406 to permit the switch 400 to close and the cam 105 moves the lever 76 and stamp unit toward the raised position of Fig. 1. As the stamp unit 60 rises, the ribbon 57 being held at the clamp 383 is drawn toward the left, as viewed in Figs. 1 and 2, by the lengthening of the path between the roller 367 and the clamp 383 with an indicia on the ribbon passing between the guide rod 290 and feeler finger 292 without engaging the feeler finger. As the ribbon continues to be moved to the left the tension in the ribbon between the clamp 383 and the roll 217 increases, thereby turning the tension lever 247 counterclockwise to release the end 238 of the brake arm 237 from the disc 235. Consequently, as the ribbon 57 continues to the left, it is unwound from the roll 217. After an indicia 56 on the ribbon 57 has passed the feeler finger 292 and as the stamp unit 60 continues to rise, the finger 342, rod 295 and feeler finger are turned clockwise (Fig. 26) to close the gap between the feeler finger and ribbon.

During the continued movement of the ribbon 57 to the left, the next indicia 56 on the ribbon engages the feeler finger 292 to turn the feeler finger and control member 291 clockwise, as viewed in Fig. 27, and the portion 315 operates the leaf spring 316 to close the limit switch 317. Closing the switch 317 again closes the circuit through the coil 501 to operate the core member 500 to close the switch 495 and open the switch 481 to deenergize the coils 487 and 490. Deenergization of the coil 487 of the solenoid 325 causes the clamp 333 to close and hold the ribbon 57 between the stamp unit 60 and roll 217 and the tension lever 247 is biassed clockwise by the spring 257 to operate the brake arm 237 to stop rotation of the roll 217. Deenergization of the coil 490 of the solenoid 392 causes the clamp 383 to open whereupon as the stamp unit 60 continues to rise, the additional ribbon required between the roller 367 and clamp is obtained by taking it from the length of ribbon between the clamp and tension lever 417. As the tension on the ribbon 57 between the clamp 383 and tension lever 417 is increased, the tension lever is turned counterclockwise to again permit engagement of the end 432 of the brake member 431 with the pulley 436 thereby stopping further rotation of the reel device 447.

As the stamp unit 60 reaches its raised position of Fig. 1, the follower 156 again engages the notch 162 in the disc 157 which turns lever 152 counterclockwise to disengage the camming portion 151 from the ends 153 of the brake shoes 141. The spring 166 thereupon biases the brake shoes 141 toward each other to again engage the brake bands 167 with the sleeve portion 171 to stop the rotation of the camshaft 106.

During the upward movement of the stamp unit 60 the high portion 212 of the cam 210 turns the lever 202 clockwise (Fig. 2) to lower the arm 190 and plate member 55 to permit the end of the stamped article to slide from the plate member and drop against the guard member 216. After placing another article on the plate member 55 another stamping cycle may again be instituted by depressing the foot treadle 182.

When it is desired to use the indicia bearing ribbon 57 of a different roll 217, the knife blade 282 is manipulated to sever the ribbon on the roll in use and this roll is then normally rotated to take up the ribbon and position the severed end as shown in Fig. 1. The ribbon of the roll 217 selected is passed over the roller 252 on the tension lever 247 associated with the spindle device 220 which carries the selected roll and beneath the roller 261 and guide surface 262 to the plate portion 266 where it is attached to the end of the preceding ribbon by gummed tape or the like. After manipulating the handle 213 to rotate the lever 202 clockwise and lower the plate member 55, the foot treadle 182 is depressed to operate the stamp unit 60 through a series of mock stamping cycles to advance the ribbon 57 until one of the newly selected indicia is centered beneath the foot member 61. When the selected indicia is different in size as well as character, it may be necessary to adjust the advance of the indicia to accurately center it beneath the foot member 61. This is accomplished by adjusting the position of the handle 347 and portion 345 relative to the finger 342 to vary the length of time that the feeler finger 292 is moved out of the path of the indicia or by adjusting the position of the housing 271 along the support rod 272. When the movement of the ribbon 57 is again adjusted to accurately position the indicia relative to the foot member 61, the handle 213 is released and the plate member 55 is returned to stamping position for subsequent stamping cycles.

It will be understood that the improvements specifically shown and described by which I obtain the above results, can be changed and modified in various ways without departing from the invention herein disclosed and hereinafter claimed.

I claim:

1. In a stamping machine for transferring indicia from a ribbon to articles, the combination of a stamp unit, means including a movable arm for moving said stamp unit between stamping and non-stamping positions, a ribbon clamping means, and means for moving said ribbon along a path to successively position the indicia thereon beneath said stamp unit, said last named means including said movable arm and said clamping means, a second clamping means, and means for controlling the operation of both said clamping means, said controlling means including means operated by the indicia during the movement of said ribbon along said path.

2. In a stamping device for transferring indicia from a ribbon to articles, the combination of a stamp unit, means including a movable arm for moving said stamp unit between stamping and non-stamping positions, a clamping means, and means for moving said ribbon along a path to successively position the indicia thereon beneath said stamp unit, said last named means including said movable arm and said clamping means, a second clamping means, and means operated by the movement of said stamp unit and said ribbon for controlling the operation of both said clamping means.

3. In a stamping device of the type for transferring indicia from a ribbon to articles, the combination of a stamp unit, means for moving said stamp unit between stamping and non-stamping positions including a movable arm, support means for a supply roll of said ribbon, means for moving said ribbon beneath said stamp unit including said movable arm and means on said movable arm for holding and releasing said ribbon between said supply roll and said stamp unit, take-up means for taking up the ribbon from said stamp unit, means mounted in fixed position relative to the movement of said movable arm for holding and releasing said ribbon between said stamp unit and said take-up means, and means operated by the movement of said stamp unit and said ribbon for controlling the operation of both of said holding and releasing means.

4. In a stamping machine for transferring indicia from a ribbon to articles, the combination of a stamp unit, means for operating said stamp unit between stamping and non-stamping positions, a support means for a supply roll of said ribbon, a reel for taking up the ribbon after the indicia has been transferred therefrom by said stamp unit, clamp means for the ribbon between the stamp unit and the supply roll, a second clamp means for the ribbon between the stamp unit and the reel and means for operating said first mentioned clamp means to release said ribbon between the stamp unit and the supply roll and to hold the ribbon between the stamp unit and reel during movement of said stamp unit to non-stamping position to advance said ribbon to successively position the indicia beneath said stamp unit.

5. In a stamping machine for transferring indicia from a ribbon to articles, the combination of a stamp unit, means supporting said unit for movement between a lower stamping position and an upper non-stamping position, means for supplying indicia bearing ribbon, means for advancing said ribbon to said unit for transfer of the indicia, means for taking up the ribbon after the indicia has been transferred, a first clamp means in the path of said ribbon between the unit and said supply means, a second clamp means in the path of the ribbon between the unit and the take-up means, means for opening said first clamp means and for closing said second clamp means to permit the advance of the ribbon by said advancing means during movement of said unit toward its upper non-stamping position and means for closing said first clamp means and opening said second clamp means when an indicia is in position for transfer by said unit.

6. In a stamping machine for transferring indicia from a ribbon to articles, the combination of a stamp unit, means supporting said unit for movement between a lower stamping position and an upper non-stamping position, means for supplying indicia bearing ribbon, means for advancing said ribbon to said unit for transfer of the indicia, means for taking up the ribbon after the indicia has been transferred, a first clamp means in the path of said ribbon between said unit and supply means, a second clamp means in the path of the ribbon between the unit and said take-up means, means for opening said first clamp means and for closing said second clamp means to permit the advance of the ribbon by said advancing means during movement of said unit toward its upper non-stamping position, means for closing said first clamp means and opening said second clamp means when an indicia is in position for transfer by said unit and means including an electrical circuit for controlling the operation of said clamp means.

7. In a stamping machine for transferring indicia from a ribbon to articles, the combination of a stamp unit, a swingable arm supporting said stamp unit for movement between a lower stamping position and an upper non-stamping position, means for supplying indicia bearing ribbon, means for taking up the ribbon after the indicia has been transferred, a first clamp means, means for supporting said first clamp means from said arm for movement therewith and in the path of said ribbon between said supply means and said unit, means for fixedly supporting a second clamp means in the path of said ribbon between said unit and said take-up means, a ribbon guide supported from said arm for movement therewith between positions relatively adjacent said second clamp means when said stamp unit is in its lower position and relatively remote from said second clamp means when the unit is in its upper position, and means for opening said first clamp means and for closing said second clamp means whereby the ribbon is advanced beneath said unit by said ribbon guide during movement of said unit toward its upper position.

8. In a stamping machine for transferring indicia from a ribbon to articles, the combination of a stamp unit, means for supporting said unit for movement between stamping and non-stamping positions, means for supplying indicia bearing ribbon, means for advancing said ribbon to place an indicia thereon in position for transfer, said last named means including means operated by the movement of said unit to non-stamping position, clamp means operable to stop the advance of the ribbon, a swingably mounted feeler in the path of and adapted to be engaged by an indicia on said ribbon for swinging movement thereby, means operated by said feeler during its swinging movement for controlling the clamping operation of said clamp means, means for determining the position of said feeler for engagement by said indicia, means for moving said feeler out of the path of said indicia and means for returning said feeler to said determined position for subsequent engagement by another indicia on said ribbon.

9. In a stamping machine for transferring indicia from a ribbon to articles, the combination of a stamp unit, means supporting said unit for movement between a lower stamping position and an upper non-stamping position, including a movable arm, means for supplying indicia bearing ribbon, means including said movable arm for moving said ribbon beneath said unit to place an indicia in position for transfer, a clamp means in the path of said ribbon between said stamp unit and supply means including a fixed member, an eccentric member rotatable to a position to clamp said ribbon against said fixed member and to a position to release said ribbon, means operated by the movement of said arm to move said eccentric member to release position, and means operated by indicia on said ribbon for moving said eccentric member to clamp position when an indicia is in position for transfer.

10. In a stamping machine for transferring indicia from a ribbon to articles to be stamped, the combination of a stamp unit, an arm supporting said unit for swinging movement between a lower stamping position and an upper non-stamping position, means for supplying indicia bearing ribbon, means for taking up the ribbon after the indicia has been transferred, a first clamp means, means for supporting said first clamp means from said arm and in the path of the ribbon between the supply means and the unit, a second clamp means, means supporting said second clamp means in fixed position and in the path of said ribbon between said unit and said take-up means, a ribbon guide, means supporting said ribbon guide from said arm and in the path of the ribbon for movement between positions relatively adjacent said second clamp means when the unit is in its lower position and relatively remote from said second clamp means when the unit is in its higher position, means for opening said first clamp means and closing said second clamp means whereby the ribbon is advanced beneath said unit upon movement of said unit toward its upper position, said last named means including means operated by the indicia on said ribbon.

11. In a stamping machine for transferring indicia from a ribbon to articles to be stamped, the combination of a stamp unit, an arm supporting said unit for swinging movement between a lower stamping position and an upper non-stamping position, means for supplying indicia bearing ribbon, means for taking up the ribbon after the indicia has been transferred, a first clamp means, means for supporting said first clamp means from said arm and in the path of the ribbon between the supply means and the unit, a second clamp means, means supporting said second clamp means in fixed position and in the path of said ribbon between said unit and said take-up means, a ribbon guide, means supporting said ribbon guide in the path of the ribbon and from said arm for movement between positions relatively adjacent said second clamp means when the unit is in its lower position and relatively remote from said second clamp means when the unit is in its higher position, means for opening said first clamp means and closing said second clamp means whereby the ribbon is advanced beneath said unit upon movement of said unit toward its upper position, said last named means including means operated by the indicia on said ribbon, and comprising a feeler for contact by said indicia.

12. In a stamping device for transferring indicia from a ribbon to articles, the combination of a stamp unit, means for moving said stamp unit between stamping and non-stamping positions, means for advancing said ribbon to position an indicia thereon beneath said stamp unit, support means for a supply roll of said ribbon at one side of said stamp unit, and take-up means for said ribbon at the other side of said stamp unit including a reel member for receiving said ribbon, friction drive means for rotating said reel, brake means for holding said reel against rotation and means controlled by the ribbon for releasing said brake means to permit rotation of said reel by said drive means to take up said ribbon.

13. In a machine for transferring indicia from an indicia carrying means to articles to be stamped therewith, a stamp unit, means for moving said stamp unit between a stamping position and a non-stamping position including a camshaft and a cam thereon, a rotatable drive shaft, a member mounted concentrically of said camshaft for rotation by said drive shaft, a member mounted in fixed position concentrically of said camshaft, and means carried by said camshaft for frictionally engaging either of said members with disengagement from the other member.

14. In a machine for transferring indicia from an indicia carrying means to articles to be stamped therewith, a stamp unit, means for moving said stamp unit between a stamping position and non-stamping position including a camshaft and a cam thereon, a rotatable drive shaft, a member mounted concentrically of said camshaft for rotation by said drive shaft and defining a surface, a member mounted in fixed position concentrically of said camshaft and defining a surface laterally spaced from said first surface; friction means carried by said camshaft means for causing engagement of said friction means with said first surface, and means for releasing engagement of said friction means with said first surface and causing engagement of said friction means with said second surface when said stamp unit is in its non-stamping position.

15. In a machine for transferring indicia from an indicia carrying member to articles to be stamped therewith, a stamp unit, means for moving said stamp unit between a stamping position and a non-stamping position including a camshaft and a cam thereon, a rotatable drive shaft, a drum mounted concentrically of said camshaft and having a flange defining a surface for engagement by a friction means, a member mounted in fixed position and having a flange concentric of said camshaft and defining a surface spaced axially from said first mentioned surface for engagement by a friction means, a friction means carried by said camshaft and operable for engagement with either of said surfaces with disengagement from the other, and means for controlling the operation of said friction means.

References Cited in the file of this patent

UNITED STATES PATENTS

| | | |
|---|---|---|
| 347,690 | Cox | Aug. 17, 1886 |
| 1,086,402 | Richardson | Feb. 10, 1914 |
| 2,102,970 | Peterson | Dec. 21, 1937 |
| 2,177,615 | Autem | Oct. 24, 1939 |
| 2,286,458 | Bowman et al. | June 16, 1942 |
| 2,674,056 | Schwartz et al. | Apr. 6, 1954 |